(12) United States Patent
Ichihashi

(10) Patent No.: US 11,561,007 B2
(45) Date of Patent: Jan. 24, 2023

(54) COMBUSTOR COOLING PANEL STUD

(71) Applicant: United Technologies Corporation, Farmington, CT (US)

(72) Inventor: Fumitaka Ichihashi, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 79 days.

(21) Appl. No.: 16/725,049

(22) Filed: Dec. 23, 2019

(65) Prior Publication Data

US 2020/0217506 A1 Jul. 9, 2020

Related U.S. Application Data

(60) Provisional application No. 62/788,607, filed on Jan. 4, 2019.

(51) Int. Cl.
*F23R 3/00* (2006.01)
*F23R 3/06* (2006.01)
(Continued)

(52) U.S. Cl.
CPC ............ *F23R 3/002* (2013.01); *F23R 3/06* (2013.01); *F02C 7/18* (2013.01);
(Continued)

(58) Field of Classification Search
CPC .. F23R 3/002; F23R 3/06; F23R 3/005; F23R 3/60; F23R 2900/03041;
(Continued)

(56) References Cited

U.S. PATENT DOCUMENTS 5,333,443 A * 8/1994 Halila ................ F23R 3/60
60/796
9,518,737 B2 12/2016 Pidcock et al.
(Continued)

FOREIGN PATENT DOCUMENTS

EP 2700877 2/2014
EP 2743585 6/2014
(Continued)

OTHER PUBLICATIONS

European Patent Office, European Search Report dated Apr. 29, 2020 in Application No. 20150393.5.

*Primary Examiner* — Arun Goyal
*Assistant Examiner* — Henry Ng
(74) *Attorney, Agent, or Firm* — Snell & Wilmer L.L.P.

(57) ABSTRACT

A combustor liner for a gas turbine engine, the combustor liner including a panel configured to at least partially define a combustion chamber. The combustor liner further includes a shell configured to mount to the panel and form a gap between the panel and the shell. The panel includes a stud and a plurality of a stand-off pins proximate to the stud defining a cavity therebetween. The shell includes a plurality of angled impingement holes located away from the cavity but extending through the shell at an orientation such that cooling air passing through the angled impingement holes is directed towards the cavity between adjacent stand-off pins and at an acute angle relative to the stud.

20 Claims, 5 Drawing Sheets

(51) Int. Cl.
*F02C 7/18* (2006.01)
*F23R 3/60* (2006.01)

(52) U.S. Cl.
CPC .. *F05D 2220/323* (2013.01); *F05D 2260/201* (2013.01); *F23R 3/005* (2013.01); *F23R 3/60* (2013.01); *F23R 2900/03041* (2013.01); *F23R 2900/03042* (2013.01); *F23R 2900/03044* (2013.01)

(58) Field of Classification Search
CPC .. F23R 2900/03042; F23R 2900/03044; F02C 7/18; F05D 2220/323; F05D 2260/201
See application file for complete search history.

(56) References Cited

U.S. PATENT DOCUMENTS

| | | | |
|---|---|---|---|
| 10,718,519 B2* | 7/2020 | Porter | F23R 3/002 |
| 2008/0104962 A1 | 5/2008 | Patel et al. | |
| 2014/0030064 A1 | 1/2014 | Bangerter | |
| 2014/0096528 A1 | 4/2014 | Cunha et al. | |
| 2014/0230440 A1* | 8/2014 | Summers | F23R 3/005 60/722 |
| 2016/0290644 A1* | 10/2016 | Cunha | F02C 7/18 |
| 2016/0305325 A1* | 10/2016 | Cunha | F02C 7/266 |
| 2016/0313004 A1 | 10/2016 | Chang et al. | |
| 2016/0313005 A1* | 10/2016 | Chang | B23K 15/0086 |
| 2016/0333735 A1* | 11/2016 | Bunker | F01D 9/023 |
| 2017/0101894 A1* | 4/2017 | Preethi | F01D 25/12 |
| 2017/0101932 A1* | 4/2017 | Stover | F01D 11/08 |
| 2017/0205069 A1* | 7/2017 | Tentorio | F23R 3/007 |
| 2017/0298824 A1* | 10/2017 | Gerendas | F23R 3/60 |
| 2017/0335716 A1* | 11/2017 | Bergholz | F01D 11/08 |
| 2020/0333006 A1* | 10/2020 | Sauer | F23R 3/002 |

FOREIGN PATENT DOCUMENTS

| | | |
|---|---|---|
| EP | 3315865 | 5/2018 |
| WO | 2015069466 | 5/2015 |

* cited by examiner

COMBUSTOR COOLING PANEL STUD

CROSS REFERENCE TO RELATED APPLICATIONS

This application claims the benefits of provisional application Ser. No. 62/788,607, filed Jan. 4, 2019 for Combustor Cooling Panel Stud and is incorporated by reference herein.

FIELD

The present disclosure relates generally to gas turbine engines and, more particularly, to a liner and shell assembly of a combustor section of a gas turbine engine having angled impingement holes.

BACKGROUND

Gas turbine engines include compressor sections to compress an airflow, combustor sections that combine the airflow with fuel for combustion and generate exhaust, and turbine sections that convert the exhaust into torque to drive the compressor sections. The combustor sections may include a liner and shell assembly which may include an outer shell and an inner panel. One or more stand-off pin may create a gap between the shell and the panel, and a stud may be used to couple the shell to the panel. It may be desirable to cool the panel and other components of the liner and shell assembly, such as the stud.

SUMMARY

Described herein is a combustor liner for a gas turbine engine, the combustor liner including a panel configured to at least partially define a combustion chamber. The combustor liner further includes a shell configured to mount to the panel and form a gap between the panel and the shell. The panel includes a stud and a plurality of a stand-off pins proximate to the stud defining a cavity therebetween. The shell includes a plurality of angled impingement holes located away from the cavity but extending through the shell at an orientation such that cooling air passing through the angled impingement holes is directed towards the cavity between adjacent stand-off pins and at an acute angle relative to the stud.

In any of the foregoing embodiments, at least one stand-off pin has a height extending from the shell to the panel, a length extending in a direction from the at least one stand-off pin to the stud, and a width that is greater than the length.

In any of the foregoing embodiments, the multiple stand-off pins surround the stud.

In any of the foregoing embodiments, the angled impingement holes are arranged in the same rotating direction around the stud.

In any of the foregoing embodiments, a pin quantity of the multiple stand-off pins equals a hole quantity of the multiple angled impingement holes.

In any of the foregoing embodiments, a pin quantity of the multiple stand-off pins is greater than a hole quantity of the multiple angled impingement holes.

In any of the foregoing embodiments, at least one angled impingement hole extends through the shell and a portion of the at least one stand-off pin to port a compressed gas through the shell and the portion of the at least one stand-off pin to an area between the stud and the at least one stand-off pin.

In any of the foregoing embodiments, the angle is selected to eject debris from the area between the stud and the at least one stand-off pin.

Also disclosed is a liner and shell assembly for use in a combustor section of a gas turbine engine. The liner and shell assembly includes a panel configured to at least partially define a combustion chamber, and a shell. The liner and shell assembly further includes a stud configured to couple the shell to the panel, and a stand-off pin proximate to the stud and configured to extend from the shell to the panel to create a gap between the panel and the shell. The liner and shell assembly further includes an angled impingement hole extending through the shell at an angle relative to a line extending from a pin center of the stand-off pin to a stud center of the stud.

In any of the foregoing embodiments, the angled impingement hole is designed to port a compressed gas through the shell to an area between the stud and the stand-off pin.

In any of the foregoing embodiments, the stand-off pin has a height extending from the shell to the panel, a length extending in a direction from the stand-off pin to the stud, and a width that is greater than the length.

In any of the foregoing embodiments, the stand-off pin includes multiple stand-off pins surrounding the stud.

In any of the foregoing embodiments, the angled impingement hole includes multiple angled impingement holes each extending through the shell and portions of respective stand-off pins.

In any of the foregoing embodiments, a pin quantity of the multiple stand-off pins equals a hole quantity of the multiple angled impingement holes.

In any of the foregoing embodiments, a pin quantity of the multiple stand-off pins is greater than a hole quantity of the multiple angled impingement holes.

In any of the foregoing embodiments, the angle is selected to eject debris from an area between the stud and the stand-off pin.

Also disclosed is a combustor section of a gas turbine engine. The combustor section includes a liner and shell assembly. The liner and shell assembly includes a panel configured to at least partially define a combustion chamber, and a shell. The liner and shell assembly further includes a stud configured to couple the shell to the panel, and a stand-off pin proximate to the stud and configured to extend from the shell to the panel to create a gap between the panel and the shell. The liner and shell assembly further includes an angled impingement hole extending through the shell at an angle relative to a line extending from a pin center of the stand-off pin to a stud center of the stud. The combustor section further includes a fuel nozzle configured to inject fuel into the combustion chamber.

In any of the foregoing embodiments, the stand-off pin has a height extending from the shell to the panel, a length extending in a direction from the stand-off pin to the stud, and a width that is greater than the length.

In any of the foregoing embodiments, the angled impingement hole extends through the shell and a portion of the stand-off pin to port a compressed gas through the shell and the portion of the stand-off pin to an area between the stud and the stand-off pin.

In any of the foregoing embodiments, the angle is selected to eject debris from the area between the stud and the stand-off pin.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
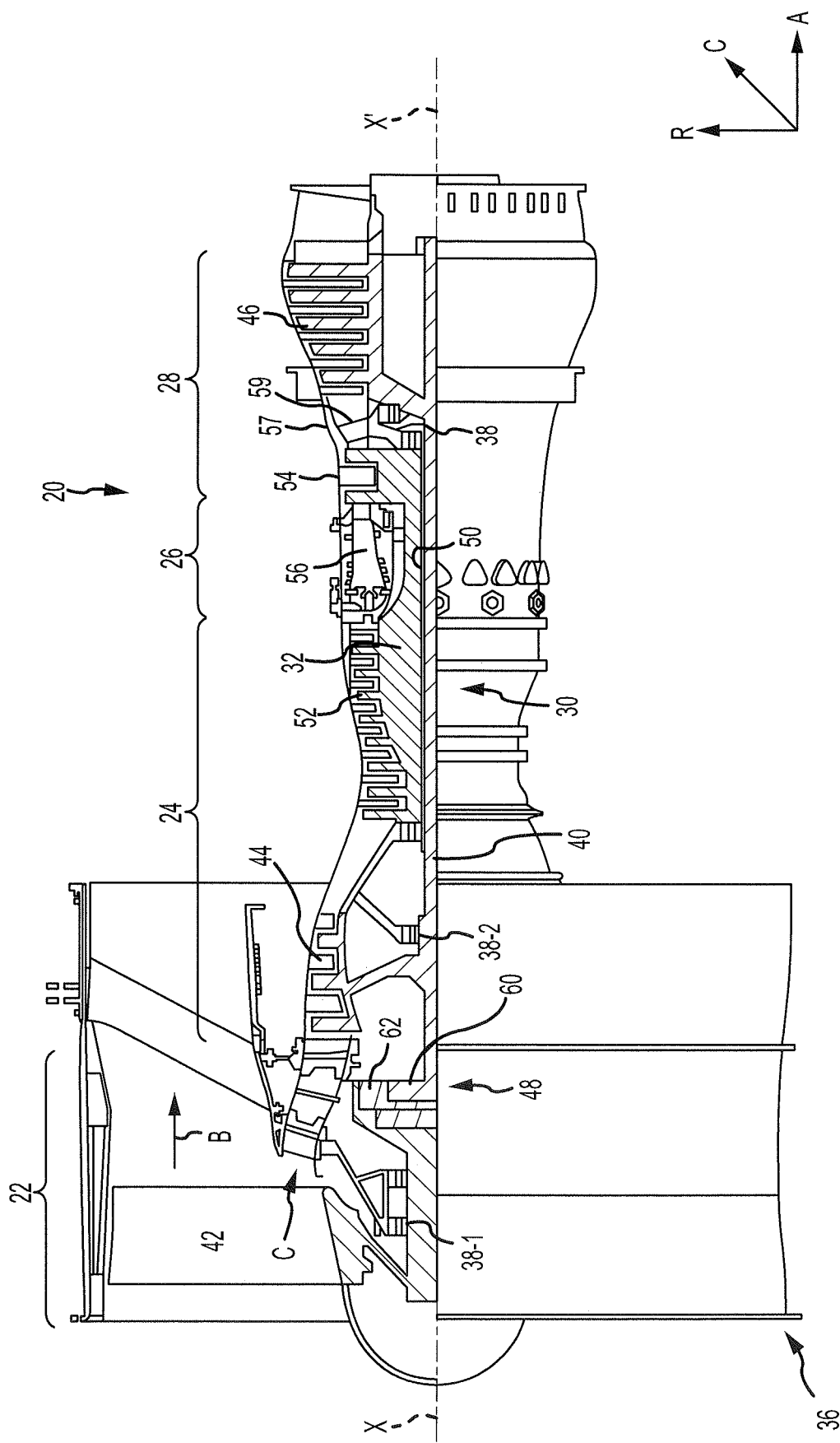
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
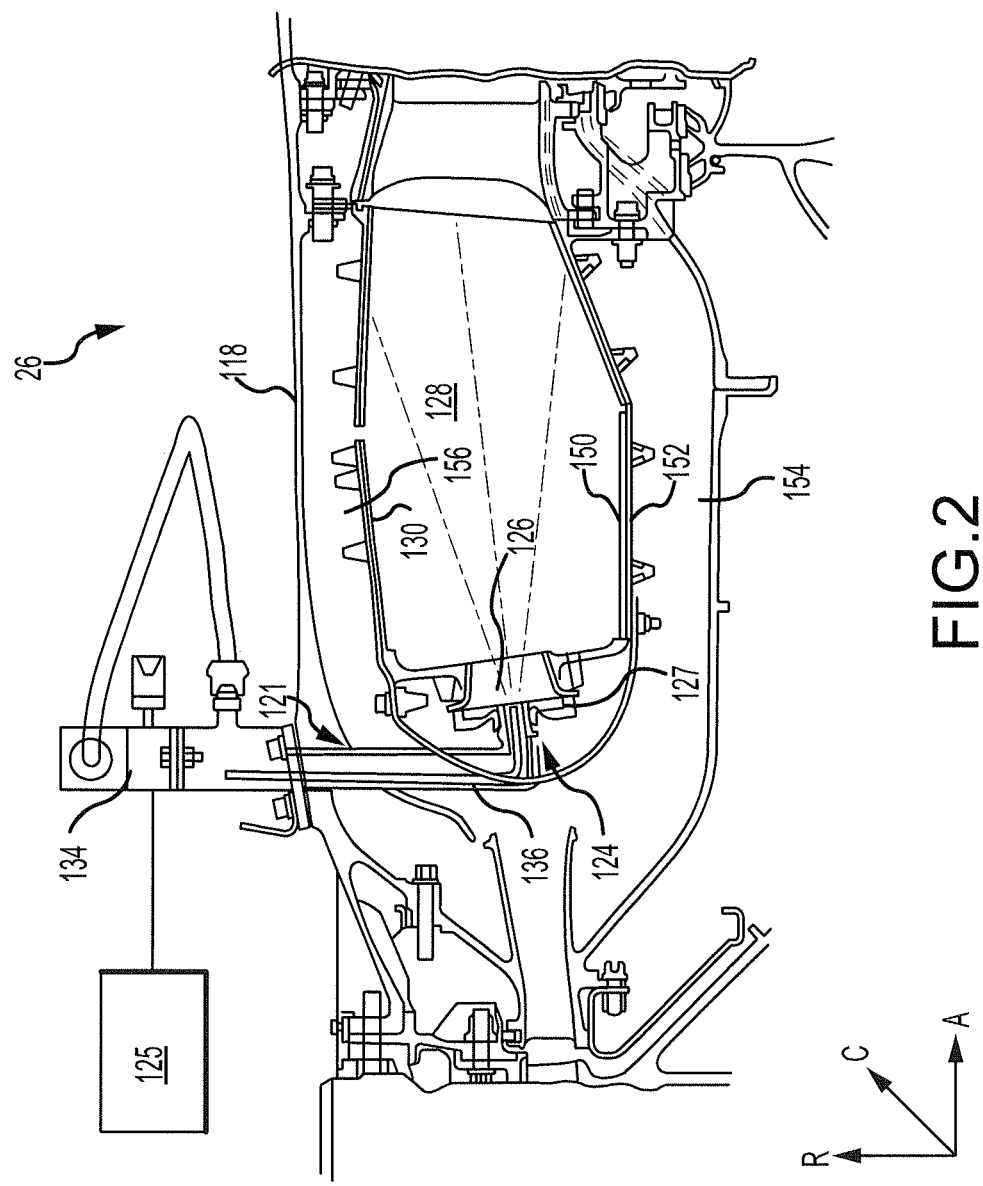
FIG. 2 is a cross-sectional view of a portion of a combustor section of the gas turbine engine of FIG. 1, in accordance with various embodiments.

In various embodiments and referring to FIG. 2, the combustor section 26 may include an annular combustor 132. The annular combustor 132 may include multiple fuel nozzles 124, which each include their own trim valve 134. In various embodiments, each fuel nozzle 124 delivers fuel to a respective section of the combustion chamber 128. The fuel nozzles 124 may be arranged circumferentially around an axis within a combustor 132. The fuel nozzles 124 may include stems 136 that extend from a diffuser case 118 to openings.

Although a single fuel nozzle 124 (and other components) is shown in the drawings, one skilled in the art will realize that the combustor section 26 may include multiple openings circumferentially around the combustor section 26 that receive fuel nozzles 124.

The combustor section 26 may further include a diffuser case 118. The diffuser case 118 surrounds or encloses a liner and shell assembly 130. The liner and shell assembly 130 may define a combustion chamber 128. A fuel source 125 provides fuel to the fuel nozzle 124 for delivery to the combustion chamber 128. The fuel nozzle 124 extends through an aperture 121 in the diffuser case 118. An end of the fuel nozzle 124 may be arranged at an inlet 126 of the combustion chamber 128. A swirler 127 (which may include a hole) may provide desired airflow motion from the compressor section 24 of FIG. 1 to achieve a desired air/fuel mixture. The liner and shell assembly 130 typically includes one or more igniters used to begin combustion of the air/fuel mixture.

The diffuser case 118 and the liner and shell assembly 130 may define an outer shroud 156 and an inner shroud 154 therebetween. In various embodiments, air or another compressed gas may flow through at least one of the inner shroud 154 or the outer shroud 156. In various embodiments, the fuel nozzle 124 may extend through the outer shroud 156 and may be extended into the inner shroud 154. The inner shroud 154 and the outer shroud 156 may each be referred to as a diffuser chamber 154, 156.

The liner and shell assembly 130 may include a panel 150 and a shell 152. In various embodiments, the shell 152 may be directly or indirectly coupled to the panel 150 to resist movement of the shell 152 relative to the panel 150. The panel 150 has a hot side that may at least partially define the combustion chamber 128, and a cold side facing the shell 152. The shell 152 may be located between the outer shroud 156 and the panel 150, or between the inner shroud 154 and the panel 150.

Figure 3:
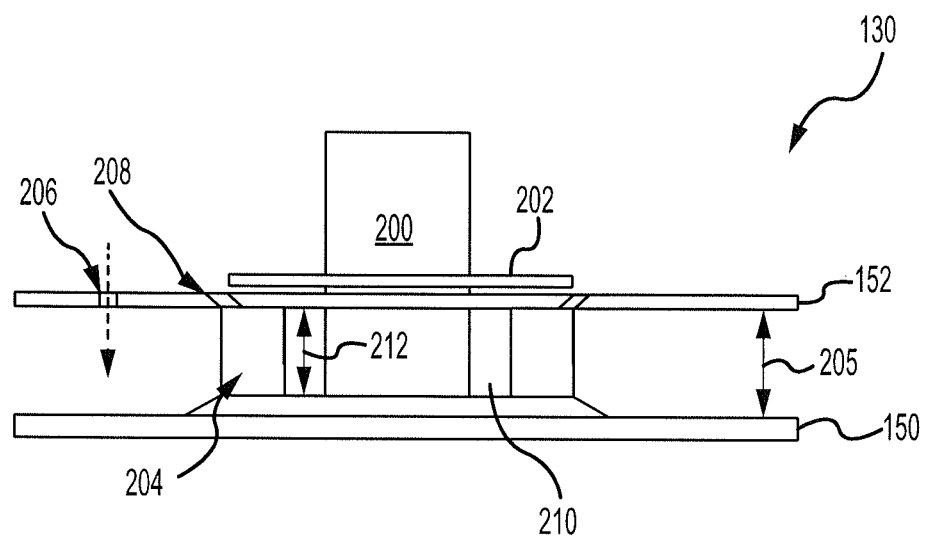
FIG. 3 illustrates a portion of a liner and shell assembly of the combustor section of FIG. 2, in accordance with various embodiments.
Figure 4:
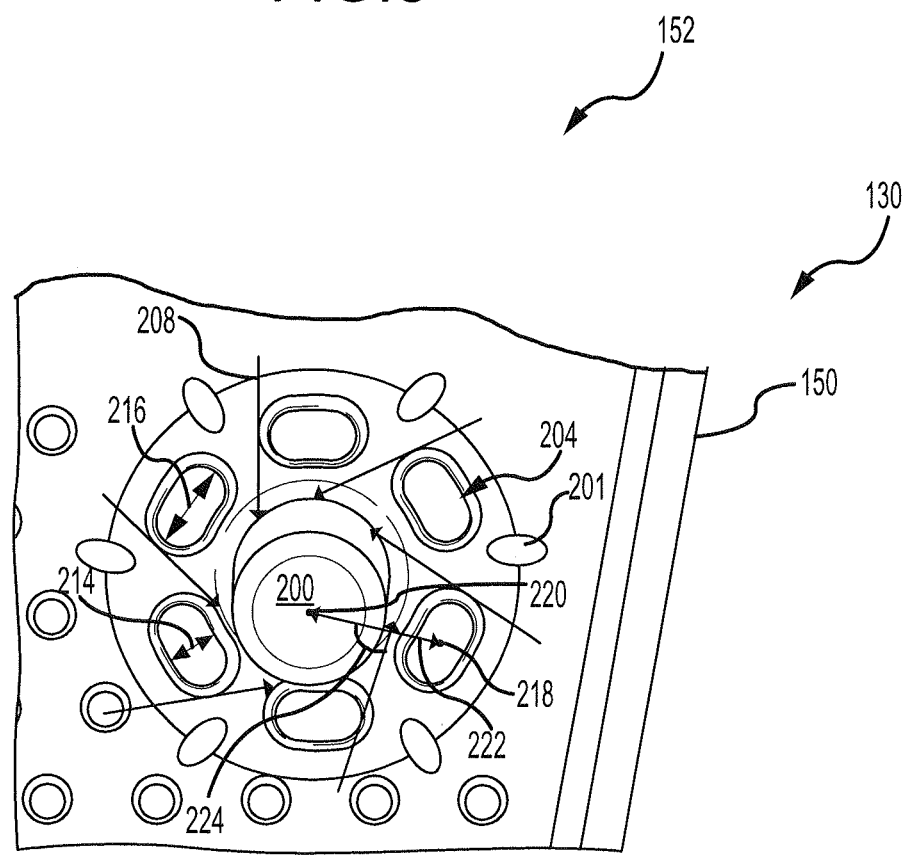
FIG. 4 illustrates the liner and shell assembly of FIG. 3, in accordance with various embodiments.

Referring now to FIGS. 3 and 4, the liner and shell assembly 130 may include a plurality of impingement holes 206 extending through the shell 152. The impingement holes 206 may port a cooling fluid such as compressed gas from the diffuser chambers 154, 156 towards the panel 150 to transfer heat from the panel 150 to the compressed gas (i.e., to cool the panel 150).

The liner and shell assembly 130 may include a stud 200 that helps couple the shell 152 to the panel 150 using a washer 202 and a fastener (not shown). The liner and shell assembly 130 may further include a plurality of stand-off pins 204. The stand-off pins 204 may extend from the panel 150 to the shell 152 and may resist movement of the panel 150 towards the shell 152. In that regard, the stand-off pins 204 may form a gap 205 between the panel 150 and the shell 152.

In addition to the impingement holes 206, the shell may include one or more angled impingement holes 208 extending therethrough. In various embodiments, one or more of the impingement holes 206 may extend through a portion of a stand-off pin 204. The angled impingement holes 208 may port the cooling fluid into an area 210 between the stud 200 and the stand-off pins 204. The cooling fluid may cool surfaces of the panel 150, the stand-off pins 204, and the stud 200. In various embodiments, the cooling fluid that flows through the angled impingement holes 208 may be angled in such a manner so as to cause the flow to wrap around the stud 200 in such a way as to turn the flow to purge debris from the area 210 (which may also be referred to as a cavity 210). In various embodiments, the angled impingement holes 208 may be arranged in a same rotating direction around the stud 200. The panel 150 includes a plurality of effusion holes 201 disposed around the stud 200 and stand-off pins 204. The effusion holes 201 introduce cooling fluid to the hot side of the panel for film cooling. The effusion holes 201 are positioned such that, when the debris is ejected from the cavity 210, the debris enters the effusion hole 201 and travels into the combustion chamber.

Figure 6:
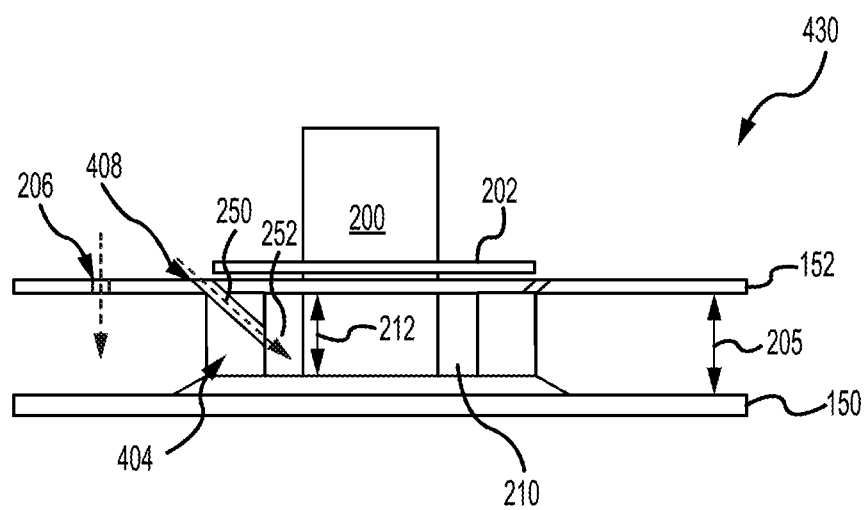
FIG. 6 illustrates a portion of a liner and shell assembly of the combustor section of FIG. 2 with an angled impingement hole extending through a portion of a respective stand-off pin, in accordance with various embodiments.

To facilitate the angled impingement holes 208, the stand-off pins 204 may have an oblong shape. In particular, the stand-off pins 204 may have a height 212 extending from the shell 152 to the panel 150, a length 214 extending in a direction from the respective stand-off pin 204 to the stud 200, and a width 216 extending in a direction perpendicular to the length 214 and the height 212. The width 216 may be greater than the length 214 to facilitate the angled impingement hole 208 extending through the portion of the respective stand-off pin 204. For example, with momentary reference to FIG. 6, a liner and shell assembly 430 is illustrated including an angled impingement hole 408 extending through the shell 152 and a portion of the respective stand-off pin 404. FIG. 6 illustrates air, represented by dashed arrow 250, exiting the angled impingement hole 408 at an area 252 (also referred to herein as a first area) between the stud 200 and the stand-off pin 404. With respect to FIG. 6, elements with like element numbering, as depicted in FIG. 3, are intended to be the same and will not necessarily be repeated for the sake of clarity.

If a liner and shell assembly included stand-off pins having equal widths and lengths, the stand-off pins would fail to structurally support impingement holes due to these dimensions. Thus, impingement holes in conventional liner and shell assemblies extend only through the shell. As a result, impingement holes in conventional liner and shell assemblies are aimed directly towards a center of the stud. This arrangement results in debris collecting in the area between the stand-off pins and the stud.

The design of the present liner and shell assembly 130 results in the angled impingement holes 208 extending at an angle 224 relative to a line 222 between a stud center 220 of the stud 200 and a pin center 218 of the respective stand-off pin 204. The angle 224 may be, for example, between 1 degree and 89 degrees, between 10 degrees and 80 degrees, between 15 degrees and 75 degrees, or the like. The angle 224 of the angled impingement holes 208 may provide cooling in the area 210 and may eject debris from the area 210.

Figure 5:
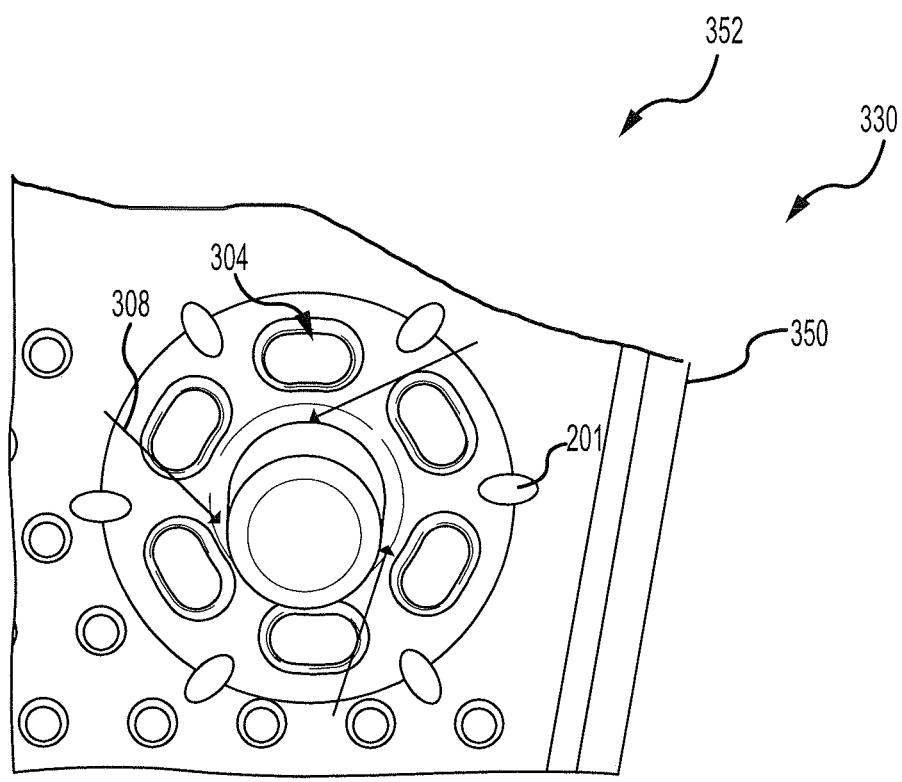
FIG. 5 illustrates a portion of a liner and shell assembly for use in a combustor section of a gas turbine engine, in accordance with various embodiments.

In various embodiments and as shown in FIG. 4, a hole quantity of angled impingement holes 208 is equal to a pin quantity of the stand-off pins 204. However, in various embodiments and as shown in FIG. 5, a liner and shell assembly 330 may include a shell 352, a panel 350, a pin quantity of stand-off pins 304, and a hole quantity of angled impingement holes 308 that is less than the pin quantity of stand-off pins 304.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A liner and shell assembly for use in a combustor section of a gas turbine engine, the liner and shell assembly comprising:
   a panel configured to at least partially define a combustion chamber;
   a shell comprising a first side facing away from the panel and a second side facing the panel;
   a stud configured to couple the shell to the panel;
   a first stand-off pin proximate to the stud and configured to extend from the second side of the shell to the panel;
   a second stand-off pin spaced apart circumferentially from the first stand-off pin relative to a centerline of the stud; and
   an angled impingement hole extending through the shell at an angle relative to a line extending from a pin center of the first stand-off pin to a stud center of the stud such that the angled impingement hole is aimed away from the center of the stud, wherein:
      an exit of the angled impingement hole is disposed between at least a portion of the first stand-off pin and the stud so that the angled impingement hole is oriented to port a cooling fluid through the shell to a first area between the stud and the first stand-off pin,
      air is configured to pass through the angled impingement hole and impinge on the first area,
      the angled impingement hole extends from the first side of the shell to the second side of the shell.

2. The liner and shell assembly of claim 1, wherein the first stand-off pin has a height extending from the shell to the panel, a length extending in a direction from the first stand-off pin to the stud, and a width that is greater than the length.

3. The liner and shell assembly of claim 1, wherein the first stand-off pin includes multiple stand-off pins surrounding the stud.

4. The liner and shell assembly of claim 3, wherein the angled impingement hole includes multiple angled impingement holes each extending through the shell.

5. The liner and shell assembly of claim 4, wherein a pin quantity of the multiple stand-off pins equals a hole quantity of the multiple angled impingement holes.

6. The liner and shell assembly of claim 4, wherein a pin quantity of the multiple stand-off pins is greater than a hole quantity of the multiple angled impingement holes.

7. The liner and shell assembly of claim 4, wherein the multiple angled impingement holes are arranged in a same rotating direction around the stud so as to cause a flow of the cooling fluid to wrap around the stud.

8. The liner and shell assembly of claim 7, wherein the first stand-off pin and the second stand-off pin include multiple stand-off pins each proximate to the stud and configured to extend from the second side of the shell to the panel, wherein a hole quantity of the multiple angled impingement holes is equal to a pin quantity of the multiple stand-off pins.

9. The liner and shell assembly of claim 1, wherein the angle is selected to eject debris from the first area between the stud and the first stand-off pin.

10. The liner and shell assembly of claim 1, wherein the angled impingement hole is angled so as to cause the air to rotate around the stud.

11. The liner and shell assembly of claim 1, wherein the angle is between one degree and eighty-nine degrees.

12. The liner and shell assembly of claim 11, wherein the angle is between ten degrees and eighty degrees.

13. The liner and shell assembly of claim 1, wherein the angled impingement hole is oriented to port the cooling fluid through the shell to the first area between the stud and the first stand-off pin so as to cause a flow of the cooling fluid to wrap around the stud so as to turn the flow of cooling fluid to purge debris from the first area.

14. The liner and shell assembly of claim 1, wherein the air exits the angled impingement hole at the first area.

15. The liner and shell assembly of claim 1, wherein the angled impingement hole is oriented to port a cooling fluid through the shell directly to the first area between the stud and the first stand-off pin.

16. A combustor section of a gas turbine engine, the combustor section comprising:
 a liner and shell assembly comprising:
  a panel configured to at least partially define a combustion chamber,
  a shell comprising a first side facing away from the panel and a second side facing the panel,
  a stud configured to couple the shell to the panel,
  a first stand-off pin proximate to the stud and configured to extend from the second side of the shell to the panel,
  a second stand-off pin spaced apart from the first stand-off pin in a circumferential direction relative to a stud centerline of the stud;
  an angled impingement hole extending through the shell at an angle relative to a line extending from a pin center of the first stand-off pin to a stud center of the stud such that the angled impingement hole is aimed away from the center of the stud, an exit of the angled impingement hole is disposed between at least a portion of the first stand-off pin and the stud so that the angled impingement hole is oriented to port a cooling fluid through the shell to a first area between the stud and the first stand-off pin, wherein air is configured to pass through the angled impingement hole and impinge on the first area, and the angled impingement hole extends from the first side of the shell to the second side of the shell; and
 a fuel nozzle configured to inject fuel into the combustion chamber.

17. The combustor section of claim 16, wherein the first stand-off pin has a height extending from the shell to the panel, a length extending in a direction from the first stand-off pin to the stud, and a width that is greater than the length.

18. The combustor section of claim 16, wherein the angled impingement hole extends through the shell and the first stand-off pin to port a compressed gas through the shell to the first area between the stud and the first stand-off pin.

19. The combustor section of claim 18, wherein the angle is selected to eject debris from the area between the stud and the first stand-off pin.

20. The combustor section of claim 16, wherein the air exits the angled impingement hole at the first area.

\* \* \* \* \*